(12) United States Patent
Iwasa

(10) Patent No.: US 9,422,414 B2
(45) Date of Patent: Aug. 23, 2016

(54) ORGANIC-INORGANIC COMPOSITE MATERIAL, OPTICAL ELEMENT, AND MULTILAYER DIFFRACTIVE OPTICAL ELEMENT

(75) Inventor: Hidefumi Iwasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 13/597,741

(22) Filed: Aug. 29, 2012

(65) Prior Publication Data

US 2013/0057956 A1    Mar. 7, 2013

(30) Foreign Application Priority Data

Sep. 2, 2011  (JP) ................................. 2011-191428

(51) Int. Cl.
| | | |
|---|---|---|
| *H01B 1/00* | (2006.01) | |
| *C08K 3/22* | (2006.01) | |
| *G02B 27/00* | (2006.01) | |
| *C08K 5/07* | (2006.01) | |
| *G02B 1/04* | (2006.01) | |
| *G02B 5/18* | (2006.01) | |

(52) U.S. Cl.
CPC ... *C08K 3/22* (2013.01); *C08K 5/07* (2013.01); *G02B 1/04* (2013.01); *G02B 1/041* (2013.01); *G02B 5/1876* (2013.01); *G02B 5/1895* (2013.01); *G02B 27/0062* (2013.01)

(58) Field of Classification Search
USPC ........................................... 359/576; 252/500
See application file for complete search history.

(56) References Cited

U.S. PATENT DOCUMENTS

| | | |
|---|---|---|
| 5,847,877 A | 12/1998 | Imamura |
| 6,912,092 B2 | 6/2005 | Ukuda |
| 7,663,803 B2 | 2/2010 | Ukuda |
| 2005/0069637 A1* | 3/2005 | Bae .......... G02B 6/138 427/163.2 |
| 2005/0101687 A1* | 5/2005 | Kim .......... C08F 2/48 522/121 |

FOREIGN PATENT DOCUMENTS

| | | |
|---|---|---|
| EP | 1394574 A2 | 3/2004 |
| JP | 2009-276726 A | 11/2009 |

* cited by examiner

*Primary Examiner* — Rei-Tsang Shiao
(74) *Attorney, Agent, or Firm* — Canon U.S.A., Inc., IP Division

(57) ABSTRACT

An organic-inorganic composite material contains a cured material of an organic-inorganic composition containing a resin component, fine particles of a transparent conductive substance, and a polymerization initiator. Refractive properties of the Abbe number vd and anomalous dispersion θg, F of the organic-inorganic composite material are within a range surrounded by (vd, θg, F)=(16, 0.50), (16, 0.40), (23, 0.50), (23, 0.47). The content of the fine particles of the transparent conductive substance in the organic-inorganic composite material is from 7.7% to 20.0% by volume. The resin component contains a compound represented by the following formula:

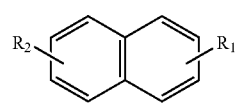

(1)

where $R_1$ and $R_2$ represent a hydrogen atom or a moiety containing a polymerizable functional group such as an acrylic group, a methacrylic group, an allyl group, a vinyl group, or an epoxy group or one or both of $R_1$ and $R_2$ represent the moiety containing the polymerizable functional group.

17 Claims, 8 Drawing Sheets

RADIATION FROM HIGH-PRESSURE MERCURY LAMP

US 9,422,414 B2

ORGANIC-INORGANIC COMPOSITE MATERIAL, OPTICAL ELEMENT, AND MULTILAYER DIFFRACTIVE OPTICAL ELEMENT

BACKGROUND OF THE INVENTION

1. Field of the Invention

The present invention relates to an organic-inorganic composite material, an optical element for use in an imaging optical system such as a camera, and a multilayer diffractive optical element.

2. Description of the Related Art

In conventional diffractive optical systems making use of light diffraction, chromatic aberration is reduced in such a manner that lenses made of lens materials having different dispersion properties are used in combination. For example, the objective lens of a telescope uses a positive lens made of a lens material with low dispersion and a negative lens made of a lens material with high dispersion in combination to correct axial chromatic aberration. However, it is difficult to correct chromatic aberration in the case where the combination or number of lenses is limited or in the case where a lens material used is limited.

U.S. Pat. No. 5,847,877 discloses that high diffraction efficiency is achieved over a wide wavelength range by optimizing the refractive index dispersion of each of optical elements and the shape of a grating formed at the interface between the optical elements. Light flux at wavelengths used is concentrated on a specific order (hereinafter referred to as the design order), whereby the intensity of diffracted light with a diffraction order other than the design order is kept low and the occurrence of a flare is suppressed.

The inventors have investigate optical materials, which are commercially available or under development, for diffractive optical elements and have obtained such distributions as shown in FIGS. 2A and 2B. FIG. 2A is a graph illustrating the distribution of the Abbe number (vd) and refractive index (nd) of common optical materials. FIG. 2B is a graph illustrating the distribution of the Abbe number (vd) and anomalous dispersion ($\theta$g, F) of common optical materials. A material for a multilayer diffractive optical element disclosed in U.S. Pat. No. 5,847,877 is included in the distribution shown in FIG. 2A or 2B.

Furthermore, U.S. Pat. No. 5,847,877 discloses that a diffractive optical element made of a material with relatively low refractive index dispersion and a diffractive optical element made of a material with relatively high refractive index dispersion are used in combination for the purpose of obtaining a configuration having high diffraction efficiency over a wide wavelength range.

The larger the difference in refractive index dispersion between a material with high refractive index dispersion and a material with low refractive index dispersion is, the higher the diffraction efficiency of an optical element containing the materials is and the wider the field angle of the optical element is. Thus, in order to accurately correct chromatic aberration, it is necessary to use a material with higher refractive index dispersion (a smaller Abbe number) and a material with lower refractive index dispersion (a larger Abbe number) in combination.

U.S. Pat. No. 6,912,092 discloses an optical material. The relationship between the refractive index (nd) and Abbe number (vd) of the optical material satisfies the inequality $nd > -6.667 \times 10^{-3} vd + 1.70$. The relationship between the anomalous dispersion ($\theta$g, F) and Abbe number (vd) of the optical material satisfies the inequality $\theta g, F \leq -2vd \times 10^{-3} + 0.59$. Since these inequalities are satisfied, increased diffraction efficiency can be achieved over the visible range.

Examples of the optical material disclosed in U.S. Pat. No. 6,912,092 include transparent conductive metal oxides, such as ITO, ATO, and $SnO_2$, exhibiting high refractive index dispersion and low anomalous dispersion.

U.S. Pat. No. 7,663,803 discloses the use of the following diffractive optical elements in combination: a diffractive optical element made of a material which has high refractive index dispersion and which contains a resin such as an acrylic resin or a fluoroacrylic resin and fine particles of a metal oxide such as ITO and a diffractive optical element made of a material which has low refractive index dispersion and which contains such a resin and fine particles of a metal oxide such as $ZrO_2$.

The typical configuration of a multilayer diffractive optical element 201 disclosed in U.S. Pat. No. 7,663,803 is described with reference to FIGS. 3A and 3B. FIG. 3A is a schematic top view of the multilayer diffractive optical element 201 and FIG. 3B is a schematic bottom view thereof. The multilayer diffractive optical element 201 has a configuration in which a high-refractive index, low-dispersion layer 203 having a grating shape and a low-refractive index, high-dispersion layer 204 are deposited on a transparent substrate layer 202 made of glass or plastic with no space therebetween. The order of deposition of the high-refractive index, low-dispersion layer 203 and the low-refractive index, high-dispersion layer 204 may be reversed. Both surfaces of the transparent substrate layer 202 may be flat, spherical, or aspherical. Each of the high-refractive index, low-dispersion layer 203 and the low-refractive index, high-dispersion layer 204 may be sandwiched between transparent substrate layers. Herein, d is the grating height and f is a portion (hereinafter referred to as the base film) other than a diffraction grating.

The following example is disclosed: an example of using a material containing fine particles of a metal oxide, represented by ITO, having high refractive index dispersion to form a diffractive optical element for the purpose of achieving increased diffraction efficiency over the visible range as described above. In general, the metal oxide fine particles are known to have a large absorption in the visible range. Therefore, in the case of using the material in optical elements for imaging devices such as cameras, the content of the metal oxide fine particles in the material may be low to achieve increased transmittance.

However, according to U.S. Pat. Nos. 6,912,092 and 7,663,803, the higher the content of the metal oxide fine particles in the material is, the higher the refractive index dispersion of the material is and the lower the anomalous dispersion thereof is. This allows the diffractive optical element to have reduced grating height and increased diffraction efficiency. In the diffractive optical element, an increase in grating height and a reduction in diffraction efficiency are causes of various flares; hence, the reduction in content of the metal oxide fine particles may not be preferred. Therefore, in order to achieve increased transmittance using the metal oxide fine particles, such as ITO particles, having high refractive index dispersion as disclosed in U.S. Pat. Nos. 6,912,092 and 7,663,803, for example, the base film f may be formed so as to have a small thickness. However, a material forming the diffractive optical element is an energy-curable resin, associated with curing shrinkage, containing a functional group such as an acrylic group. Therefore, the reduction in thickness of the base film f with respect to the grating height d is likely to cause defects such as sink marks. In order to avoid the defects, there are a technique for controlling a curing reaction such that the curing reaction proceeds very slowly and a technique for carrying out a curing reaction using a press mechanism, which leads to the need to increase the takt time for forming or the need to upgrade an apparatus. The techniques are limited in suppressing the defects, such as sink marks.

Thus, in conventional techniques, the following material has been unavailable: a material capable of achieving an optical element which has high diffraction efficiency in the visible range and reduced grating height and which is highly transparent without extremely reducing the thickness of the base film f with respect to the grating height d.

SUMMARY OF THE INVENTION

Aspects of the present invention have been made in view of the foregoing techniques and provide an organic-inorganic composite material used to form an optical element which has high diffraction efficiency, which can be reduced in grating height, and which is highly transparent.

Furthermore, aspects of the present invention provide an optical element and multilayer diffractive optical element made of the organic-inorganic composite material.

An organic-inorganic composite material capable of solving the above problems contains a cured material of an organic-inorganic composition containing a resin component, fine particles of a transparent conductive substance, and a polymerization initiator. Refractive properties of the Abbe number vd and anomalous dispersion θg, F of the organic-inorganic composite material are within a range surrounded by (vd, θg, F)=(16, 0.50), (16, 0.40), (23, 0.50), (23, 0.47). The content of the fine particles of the transparent conductive substance in the organic-inorganic composite material is from 7.7% to 20.0% by volume. The resin component contains a compound represented by the following formula:

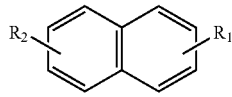

(1)

where $R_1$ and $R_2$ represent a hydrogen atom or a moiety containing a polymerizable functional group such as an acrylic group, a methacrylic group, an allyl group, a vinyl group, or an epoxy group or one or both of $R_1$ and $R_2$ represent the moiety containing the polymerizable functional group.

An optical element capable of solving the problems includes a transparent substrate and an organic-inorganic composite material placed on the transparent substrate. The organic-inorganic composite material contains a cured material of an organic-inorganic composition containing a resin component, fine particles of a transparent conductive substance, and a polymerization initiator. Refractive properties of the Abbe number vd and anomalous dispersion θg, F of the organic-inorganic composite material are within a range surrounded by (vd, θg, F)=(16, 0.50), (16, 0.40), (23, 0.50), (23, 0.47). The content of the fine particles of the transparent conductive substance in the organic-inorganic composite material is from 7.7% to 20.0% by volume. The resin component contains a compound represented by the following formula:

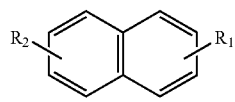

(1)

where $R_1$ and $R_2$ represent a hydrogen atom or a moiety containing a polymerizable functional group such as an acrylic group, a methacrylic group, an allyl group, a vinyl group, or an epoxy group or one or both of $R_1$ and $R_2$ represent the moiety containing the polymerizable functional group.

A multilayer diffractive optical element capable of solving the problems includes a first diffractive optical sub-element and a second diffractive optical sub-element. The first diffractive optical sub-element has a diffractive surface having a diffraction pattern and is made of an organic-inorganic composite material containing a cured material of an organic-inorganic composition containing a resin component, fine particles of a transparent conductive substance, and a polymerization initiator. Refractive properties of the Abbe number vd and anomalous dispersion θg, F of the organic-inorganic composite material are within a range surrounded by (vd, θg, F)=(16, 0.50), (16, 0.40), (23, 0.50), (23, 0.47). The content of the fine particles of the transparent conductive substance in the organic-inorganic composite material is from 7.7% to 20.0% by volume. The second diffractive optical sub-element is made of a material having a refractive index and Abbe number greater than those of the first diffractive optical sub-element and has a diffractive surface having a diffraction pattern. The first and second diffractive optical sub-elements are arranged such that the diffractive surfaces of the first and second diffractive optical sub-elements face each other and are in tight contact with each other. The resin component contains a compound represented by the following formula:

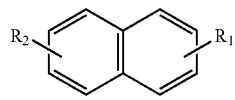

(1)

where $R_1$ and $R_2$ represent a hydrogen atom or a moiety containing a polymerizable functional group such as an acrylic group, a methacrylic group, an allyl group, a vinyl group, or an epoxy group or one or both of $R_1$ and $R_2$ represent the moiety containing the polymerizable functional group.

According to aspects of the present invention, the following material can be provided: an organic-inorganic composite material used to form an optical element which has high diffraction efficiency, which can be reduced in grating height, and which is highly transparent.

Furthermore, according to aspects of the present invention, an optical element and multilayer diffractive optical element made of the organic-inorganic composite material can be provided.

Further features of the present invention will become apparent from the following description of exemplary embodiments with reference to the attached drawings.

DESCRIPTION OF THE EMBODIMENTS

Figure 1A:
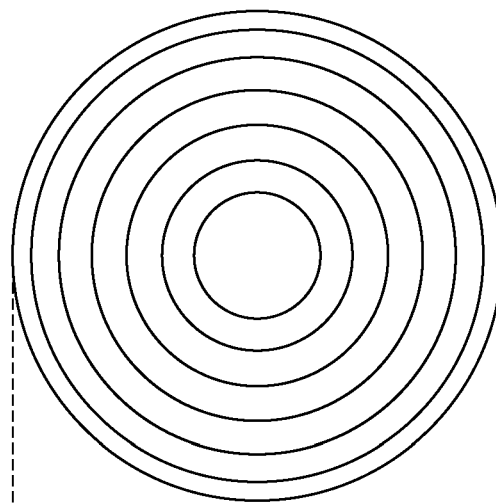
FIG. 1A is a top view of a multilayer diffractive optical element according to an embodiment of the present invention and FIG. 1B is a sectional view of the multilayer diffractive optical element.

Embodiments of the present invention will now be described in detail.

An organic-inorganic composite material according to an embodiment of the present invention contains a cured material of an organic-inorganic composition containing a resin component, fine particles of a transparent conductive substance, and a polymerization initiator. The content of the fine particles of the transparent conductive substance in the organic-inorganic composite material is 7.7% to 20.0% by volume. The resin component contains a compound represented by the following formula:

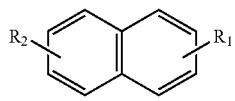 (1)

where $R_1$ and $R_2$ represent a hydrogen atom or a moiety containing a polymerizable functional group such as an acrylic group, a methacrylic group, an allyl group, a vinyl group, or an epoxy group or one or both of $R_1$ and $R_2$ represent the moiety containing the polymerizable functional group.

Components of the organic-inorganic composite material are described below.

Resin Component

The resin component, which is contained in the organic-inorganic composite material, contains the compound represented by Formula (1). The compound represented by Formula (1) has a naphthalene nucleus. The position of each of $R_1$ and $R_2$ is not particularly limited and may be any one of the 1- to 8-positions of the naphthalene nucleus.

Examples of the compound represented by Formula (1) include monoallyl esters of naphthalene dicarboxylic acids, diallyl esters of naphthalene dicarboxylic acids, monoacryloyloxyethyl esters of naphthalene dicarboxylic acids, diacryloyloxyethyl esters of naphthalene dicarboxylic acids, monomethacryloyloxyethyl esters of naphthalene dicarboxylic acids, dimethacryloyloxyethyl esters of naphthalene dicarboxylic acids, vinylnaphthalene, and divinylnaphthalene.

The compound represented by Formula (1) is not limited to these monomers and may be an oligomer, prepolymer, dimer, or polymer made from one of these monomers. These monomers may be used alone or in combination depending on curability, refractive properties, and crystallinity. Among these monomers, a diallyl or diacryloyloxyethyl ester of a naphthalene dicarboxylic acid may be used and the naphthalene dicarboxylic acid diallyl ester may be used.

The content of the compound represented by Formula (1) in the organic-inorganic composition may be 3% to 60% by weight such as 6% to 45% by weight. When the content thereof is less than the above range, a larger amount of the fine particles of the transparent conductive substance need to be used to obtain predetermined refractive properties (Abbe number) for optical design. This causes a reduction in transmittance. When the content thereof is more than the above range, a larger amount of the fine particles of the transparent conductive substance need to be used to obtain predetermined refractive properties (anomalous dispersion) for optical design. This also causes a reduction in transmittance.

The resin component, which is contained in the organic-inorganic composition, may further contain an additional component, such as a monomer, oligomer, or a polymer, containing a polymerizable function group such as an acrylic group, a methacrylic group, a vinyl group, or an epoxy group in addition to the compound represented by Formula (1). The additional compound serves as a cross-linking agent. The additional component need not contain any polymerizable functional group.

The resin component, which is contained in the organic-inorganic composition, may further contain a releasing agent, a sensitizer, an oxidation inhibitor, a stabilizer, and/or a thickening agent. In this case, resin having good compatibility and the like may be selected.

Fine Particles of Transparent Conductive Substance

The fine particles of the transparent conductive substance, which is contained in the organic-inorganic composite material, may be fine particles of a metal oxide.

Examples of the transparent conductive substance include, but are not limited to, tin-doped indium oxide (ITO), antimony-doped tin oxide (ATO), zinc-doped indium oxide (IZO), aluminum-doped zinc oxide (AZO), gallium-doped zinc oxide (GZO), and fluorine-doped tin oxide (FTO). Fine particles of a composite oxide containing Si, Ti, Sn, or Zr may be used.

Primary particles of the transparent conductive substance may have such an average size that transmittance, scattering, and the like are not adversely affected. In particular, the primary particles may have a number-average size of 2 nm to 50 nm, such as 2 nm to 30 nm. However, even though the primary particles have a number-average size of 30 nm or less, scattering is significantly adversely affected when the distribution of particle size is broad and therefore the volume fraction of particles with a size of more than 30 nm is 5% or more. In this case, unnecessary large particles may be removed from the fine particles in a stage of preparing raw materials in such a manner that the fine particles are filtered through a filter having pores less in size than the unnecessary large particles.

The content of the fine particles of the transparent conductive substance in the organic-inorganic composite material is 7.7% to 20.0% by volume in terms of volume fraction. When the content thereof is more than 20.0% by volume, an increase in scattering or a reduction in transmittance is caused. In particular, in the case of a substance, such as ITO, having a color in the visible range, transmittance is significantly affected depending on the grating height d of a formed optical element or the thickness of a base film f as described above.

Furthermore, an increase in viscosity is caused. This may possibly result in a reduction in formability, a reduction in handleability, and a reduction in material productivity. In the case of using a dispersant or a surface treatment agent to disperse the fine particles, the increase in amount of the fine particles increases the amount of the dispersant or the surface treatment agent. This may possibly result in that predetermined optical or mechanical properties are unlikely to be obtained. When the content thereof is less than 7.7% by volume, the influence of the fine particles on optical properties such as refractive index, Abbe number, and anomalous dispersion is small, which may not be preferred.

Polymerization Initiator

Since the organic-inorganic composition contains the polymerization initiator in addition to the resin component, the resin component can be polymerized by applying active energy to the organic-inorganic composition, whereby the cured material is obtained.

Examples of active energy include ultraviolet rays emitted from a light source; electron beams emitted from an electron linear accelerator with an accelerating voltage of 20 kV to 2,000 kV; active energy rays such as α-rays, β-rays, and γ-rays; and infrared rays. Examples of the light source include xenon lumps, low-pressure mercury lamps, high-pressure mercury lamps, ultra-high-pressure mercury lamps, metal halide lamps, carbon-arc lamps, and tungsten lamps. Other examples of active energy include, but are not limited to, heat and ultrasonic waves.

A polymerization initiator (hereinafter referred to as the photopolymerization initiator) for photopolymerization can make use of a mechanism of generating radicals by photoirradiation using a radical polymerization initiator. In usual, the photopolymerization initiator is suitable for forming a replica such as a lens. Examples of a photopolymerization initiator useful in polymerizing the resin component include 2-benzyl-2-dimethylamino-1-(4-morpholinophenyl)-1-butanone, 1-hydroxy-cyclohexyl phenyl ketone, 2-methyl-1-(4-methylthiophenyl)-2-morpholinopropane-1-one, bis(2,4,6,-trimethylbenzoyl)-phenylphosphineoxide, 4-phenylbenzophenone, 4-phenoxybenzophenone, 4,4'-diphenylbenzophenone, and 4,4'-diphenoxybenzophenone. Not only a radical polymerization initiator but also a cationic polymerization initiator and an anionic polymerization initiator can be used. The content of the photopolymerization initiator can be appropriately selected depending on the dose of irradiation and additional heat and can be adjusted depending on the target average molecular weight of an obtained polymer.

In the case of using the photopolymerization initiator to cure or form the organic-inorganic composition, the amount of the added photopolymerization initiator may be 0.01% to 10.00% by weight of the resin component such as 0.1% to 5.00% by weight depending on the type and content of fine particles used. The photopolymerization initiator may be used alone or in combination with one or more photopolymerization initiators depending on the reactivity of the resin component and the wavelength of applied light.

A polymerization initiator (hereinafter referred to as the thermal polymerization initiator) for thermal polymerization can make use of a mechanism of generating radicals by heating using a radical polymerization initiator as described above. In usual, the thermal polymerization initiator is suitable for forming a replica such as a lens. Examples of a photopolymerization initiator useful in polymerizing the resin component include azobisisobutyronitrile (AIBN), benzoyl peroxide, t-butyl peroxypivalate, t-butyl peroxyneohexanoate, t-hexyl peroxyneohexanoate, t-butyl peroxyneodecanoate, t-hexyl peroxyneodecanoate, cumyl peroxyneohexanoate, and cumyl peroxyneodecanoate. Not only a radical polymerization initiator but also a cationic polymerization initiator and an anionic polymerization initiator can be used. The content of the thermal polymerization initiator can be appropriately selected depending on the heating temperature and additional photoirradiation and can be adjusted depending on the target degree of polymerization of an obtained molded product.

In the case of using the thermal polymerization initiator to cure or form the organic-inorganic composition, the amount of the added thermal polymerization initiator may be 0.01% to 10.00% by weight of the resin component such as 0.1% to 5.00% by weight depending on the type and content of fine particles used. The thermal polymerization initiator may be used alone or in combination with one or more thermal polymerization initiators depending on the reactivity of the resin component and the wavelength of applied light.

Surface Treatment Agent or Dispersant

The fine particles of the transparent conductive substance may be surface-treated. The fine particles thereof may be surface-treated in a stage of synthesizing or producing the fine particles thereof or after the fine particles thereof are obtained.

According to aspects of the present invention, the surface treatment agent (surfactant) or the dispersant may be used to uniformly disperse the fine particles of the transparent conductive substance such that the fine particles thereof are not aggregated. In general, it is known that in the case of using a surface treatment agent or a dispersant to disperse fine particles in a solvent or a resin, completely different dispersion states are exhibited depending on the type, content, molecular weight, polarity, and/or affinity of the surface treatment agent or the dispersant. The surface treatment agent or dispersant used herein may be a derivative of a pigment or a resin type or active type of pigment. The surface treatment agent or dispersant used herein may be a cationic, weak cationic, nonionic, or amphoteric surfactant. In particular, the following compounds can be used: polyesters, polycaprolactones, polycarboxylates, polyphosphates, hydrostearates, amidosulfonates, polyacrylates, olefin-maleate copolymers, acrylate-maleate copolymers, alkylamine acetates, alkyl esters of fatty acids, polyethylene glycol esters of fatty acids, silicones, and fluorides. In aspects of the present invention, at least one selected from the polycaprolactones may be used. Furthermore, Disperbyk Series products (produced by BYK Chemie) and Solsperse Series products (produced by Zeneca Inc.) may be provided. The Disperbyk series products include Disperbyk 102, 103, 104, 116, 142, 145, 163, 164, 170, 180, 2155, 2164, and 2096 and also include ANTI-TERRA-U100 and 205. The Solsperse Series products include Solsperse 3000, 9000, 17000, 20000, 24000, and 41090.

The amount of the added surface treatment agent or dispersant varies depending on the type of the surface treatment agent or the dispersant, the type or surface area (size) of the fine particles, the type of the resin component, which is mixed with the fine particles, or the type of a solvent. In aspects of the present invention, the amount thereof may be 0.1% to 30.0%, such as 5.0% to 25.0% of the weight of the fine particles. When the amount thereof is excessively large, white turbidity occurs to cause scattering; hence, properties (refractive index, Abbe number, anomalous dispersion, elastic modulus, and the like) of a finally obtained composition containing the fine particles are needlessly reduced. The dispersant may be used alone or in combination with one or more dispersants.

Solvent

In aspects of the present invention, a solvent is used to dissolve the resin component and the polymerization initiator or to disperse the fine particles of the transparent conductive substance and to dissolve the surface treatment agent or the dispersant. Examples of the solvent include, but are not limited to, aromatic hydrocarbons such as toluene, benzene, and xylene; alcohols such as ethanol and isopropanol; alicyclic hydrocarbons such as cyclohexane; acetates such as ethyl acetate and butyl acetate; ketones such as acetone and methyl ethyl ketone; amides such as dimethylformamide (DMF), dimethylacetamide (DMAc), and N-methylpyrrolidone (NMP); aliphatic hydrocarbons such as hexane and octane; ethers such as diethylether and butylcarbitol; and halogenated hydrocarbons such as dichloromethane and carbon tetrachloride. The solvent can be selected depending on the solubility of the resin component or the polymerization initiator or the affinity of the fine particles, the surface treatment agent, or the dispersant. The solvent may be used alone or in combination with one or more solvents as long as solubility or the dispersibility of the fine particles is not impaired.

The organic-inorganic composite material contains the cured material of the organic-inorganic composition.

The organic-inorganic composite material contains the cured material of the organic-inorganic composition, which contains the resin component containing the compound represented by Formula (1), the fine particles of the transparent conductive substance, and the polymerization initiator. Refractive properties of the Abbe number vd and anomalous dispersion θg, F of the organic-inorganic composite material are within a range surrounded by (vd, θg, F)=(16, 0.50), (16, 0.40), (23, 0.50), (23, 0.47) and the content of the fine particles of the transparent conductive substance in the organic-inorganic composite material is 7.7% to 20.0% by volume.

Figure 8:
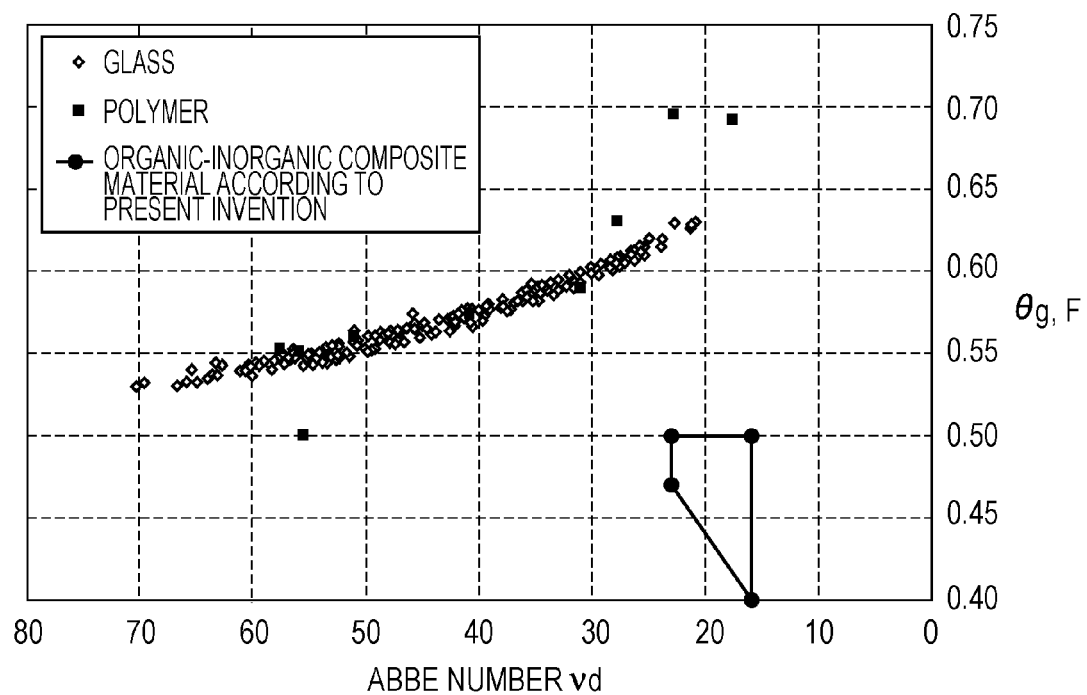
FIG. 8 is a graph illustrating the range of refractive properties of the Abbe number vd and anomalous dispersion θg, F of an organic-inorganic composite material according to an embodiment of the present invention.

FIG. 8 is a graph illustrating the range of refractive properties of the Abbe number vd and anomalous dispersion θg, F of the organic-inorganic composite material. As illustrated in FIG. 8, refractive properties of the Abbe number vd and anomalous dispersion θg, F of the organic-inorganic composite material are within a range surrounded by (vd, θg, F)=(16, 0.50), (16, 0.40), (23, 0.50), (23, 0.47). FIG. 8 also illustrates the distribution of the Abbe number vd and anomalous dispersion θg, F of common optical materials and shows that the organic-inorganic composite material is different in refractive properties from the common optical materials.

A method of producing the organic-inorganic composite material is described below.

The organic-inorganic composite material can be produced by photopolymerization.

An adequate amount of the surface treatment agent or dispersant is dissolved in the solvent. A predetermined amount of the fine particles of the transparent conductive substance are added to the solvent and are dispersed therein by various methods, whereby slurry containing the solvent and the fine particles uniformly dispersed therein is obtained. The slurry can be prepared using a disperser such as an ultrasonic mill, a sand mill, a jet mill, a disk mill, or a bead mill. The use of the bead mill allows the slurry to have low scattering. A medium used for bead mill treatment can be selected from media made of various materials such as silica, alumina, and zirconia and may be one made of zirconia from the viewpoint of hardness. The medium may have a number-average particle size of 10 μm to 500 μm. The particle size of the medium can be adjusted depending on the average size and degree of dispersion of the fine particles to be dispersed and may be 10 μm to 100 μm.

The resin component and the polymerization initiator are dissolved in the slurry. A cross-linking agent, a releasing agent, a sensitizer, an oxidation inhibitor, a stabilizer, and/or a thickening agent may be added to the slurry. In this case, the solvent and the surface treatment agent or the dispersant may be combined such that the dispersion state of the fine particles is hardly deteriorated. Aggregates of the fine particles may be removed by filtering. After it is confirmed that the fine particles are not precipitated but are appropriately dispersed, the solvent is removed from the slurry using an evaporator or the like, whereby the organic-inorganic composition can be obtained.

When the solvent is removed, the degree of vacuum and/or the heating temperature of the slurry may be adjusted depending on the boiling point of the solvent or the amount of the remaining solvent. When the degree of vacuum is excessively high, the surface treatment agent or the dispersant and other additives may possibly be distilled off together with the solvent if decompression is performed together with excessive heating or a decompression step is performed for a long time. Therefore, the degree of vacuum, the temperature, the time, or the like needs to be adjusted in consideration of the molecular weight, boiling point, sublimation, or the like of each component. The rapid evaporation or removal of the solvent may possibly deteriorate the degree of aggregation of the fine particles to impair the dispersion of the fine particles.

The obtained organic-inorganic composition may possibly contain the remaining solvent, which cannot be entirely removed. The durability or optical properties of a molded product may possibly be adversely affected depending on the content of the solvent in the organic-inorganic composition. Therefore, the content of the remaining solvent in the organic-inorganic composition may be 0.001% to 0.50% by weight.

The organic-inorganic composition is cured by applying active energy to the organic-inorganic composition, whereby the organic-inorganic composite material, which contains the cured material, is obtained.

As a specific example, the following process is described below: a process for obtaining the cured material through a step of forming a molding layer by photopolymerization in the manufacture of a diffractive optical element according to an embodiment of the present invention.

In the case of forming a layer structure with a small thickness on a substrate such as a transmitting substrate, a glass material is used to form the substrate and a metal material is used to form a die corresponding to a fine grating structure. The organic-inorganic composition is provided between the substrate and the die and is filled in a die pattern by pressing, whereby molding is performed. The organic-inorganic composition is irradiated with light with the organic-inorganic composition maintained as it is, whereby polymerization is performed. The substrate is separated from the die, whereby the diffractive optical element is obtained. The diffractive optical element is made of the organic-inorganic composite material containing the cured organic-inorganic composition combined with the substrate.

Photoirradiation used for such a photopolymerization reaction is performed using light with an appropriate wavelength, usually ultraviolet or visible light, depending on a mechanism of generating radicals using the photopolymerization initiator. For example, the organic-inorganic composition is uniformly irradiated with light through the substrate, which is made of the glass material. The amount of light applied to the organic-inorganic composition is appropriately selected depending on the mechanism of generating the radicals using the photopolymerization initiator or the content of the photopolymerization initiator.

In the preparation of the molding layer by the photopolymerization reaction, the organic-inorganic composition may be uniformly irradiated with light. Thus, the wavelength of the light used may be selected such that the light used can be uniformly applied to the organic-inorganic composition through the substrate. The thickness of the base film f of the diffractive optical element, which includes the molding layer formed on the substrate, can be adjusted by controlling the pressure applied to the substrate or the shape of the die.

Likewise, the molding layer can be formed by thermal polymerization. In this case, the entire temperature may be uniform.

Accordingly, a plurality of layers made of materials having different refractive index dispersion properties can be deposited on the substrate by the above process using the organic-inorganic composition. This allows the diffractive optical element, which has been designed such that the diffraction efficiency of a specific order (design order) is high over wavelengths used, to be manufactured in a short time.

An optical element according to an embodiment of the present invention includes a transparent substrate and the organic-inorganic composite material placed on the transparent substrate. The organic-inorganic composite material may have a diffractive surface having a diffraction pattern.

A multilayer diffractive optical element according to an embodiment of the present invention includes a first diffractive optical sub-element which is made of the organic-inorganic composite material and which has a diffractive surface having a diffraction pattern and also includes a second diffractive optical sub-element which is made of a material having a refractive index and Abbe number greater than those of the first diffractive optical sub-element and which has a diffractive surface having a diffraction pattern. The first and second diffractive optical sub-elements are arranged such that the diffractive surfaces of the first and second diffractive optical sub-elements face each other and are in tight contact with each other.

The first diffractive optical sub-element is made of the organic-inorganic composite material. Refractive properties of the first diffractive optical sub-element may satisfy the range of (vd, θg, F)=(16, 0.50), (16, 0.40), (23, 0.50), (23, 0.47).

The second diffractive optical sub-element is made of glass, resin, or an organic-inorganic composite material. This organic-inorganic composite material contains, for example, fine particles of a metal oxide such as $ZrO_2$ or $Al_2O_3$.

The typical configuration of the multilayer diffractive optical element is described below with reference to FIGS. 1A and 1B.

Figure 1B:
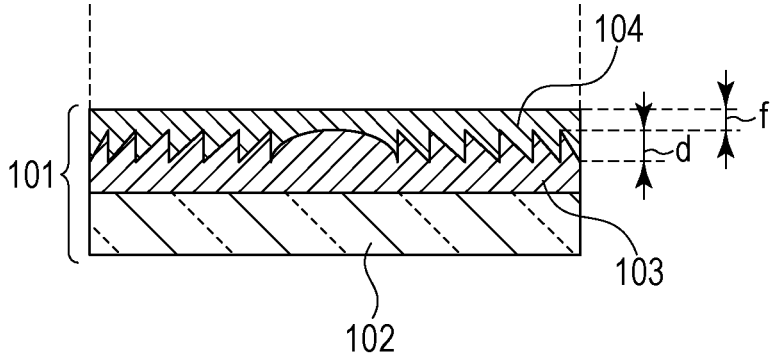
Figure 2A:
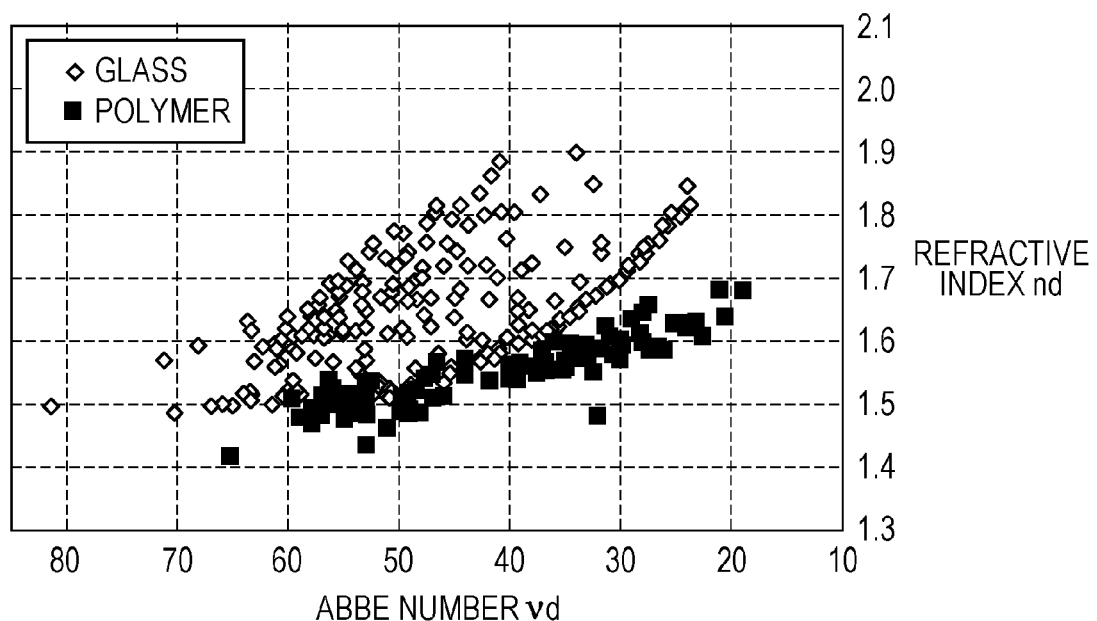
FIG. 2A is a graph illustrating the distribution of the Abbe number (vd) and refractive index (nd) of common optical materials and FIG. 2B is a graph illustrating the distribution of the Abbe number (vd) and anomalous dispersion (θg, F) of common optical materials.
Figure 2B:
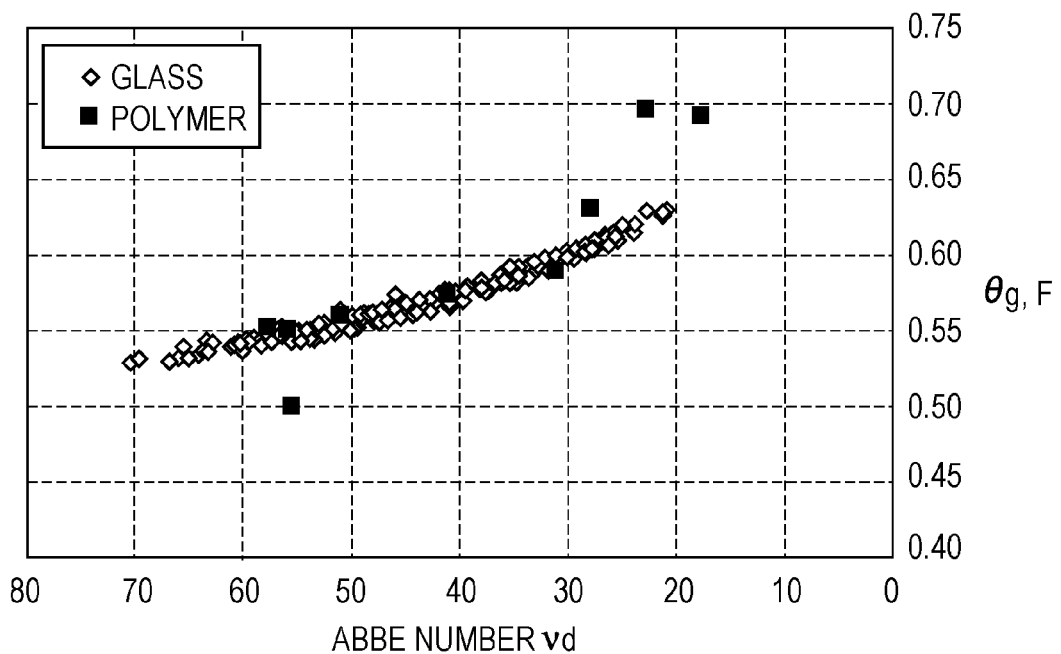
Figures 3A, 3B:
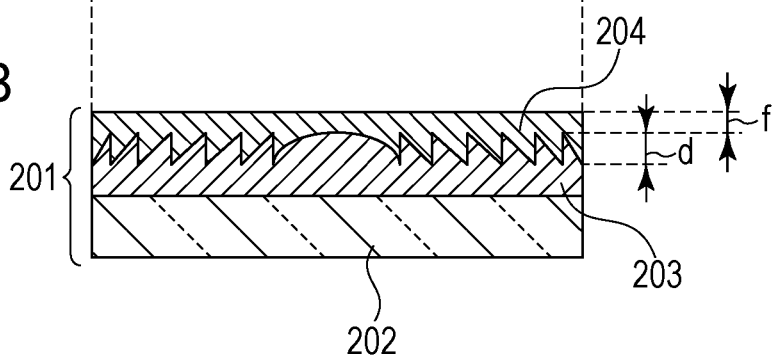
FIG. 3A is a schematic top view of a conventional multi-layer diffractive optical element and FIG. 3B is a schematic bottom view thereof.

FIGS. 1A and 1B schematically illustrate the multilayer diffractive optical element 101. FIG. 1A is a top view of the multilayer diffractive optical element 101 and FIG. 1B is a sectional view thereof. The multilayer diffractive optical element 101 has a configuration in which a high-refractive index, low-dispersion layer 103 having a grating pattern and a low-refractive index, high-dispersion layer 104 made of the organic-inorganic composite material according to aspects of the present invention are deposited on a transparent substrate layer 102 made of glass or plastic without any space therebetween. The order of deposition of the high-refractive index, low-dispersion layer 103 and the low-refractive index, high-dispersion layer 104 may be reversed. Both surfaces of the transparent substrate layer 102 may be flat, spherical, or aspherical. Each of the high-refractive index, low-dispersion layer 103 and the low-refractive index, high-dispersion layer 104 may be sandwiched between transparent substrate layers.

Herein, d is the grating height and f is a portion (hereinafter referred to as the base film) other than a diffraction grating. The grating height may be 15.0 μm or less. The base film may be thin as long as there is no harm in forming a molding.

The organic-inorganic composite material according to aspects of the present invention is used as an optical material. A multilayer diffractive optical element according to aspects of the present invention includes a diffractive optical sub-element and another diffractive optical sub-element having a relatively lower refractive index and higher refractive index dispersion as compared to that diffractive optical sub-element. The multilayer diffractive optical element including that diffractive optical sub-element, which is made of the organic-inorganic composite material, and this diffractive optical sub-element can efficiently eliminate chromatic aberration and reductions in size and weight can be achieved. An obtained optical element has very high diffraction efficiency, can be reduced in grating height, and is highly transparent.

Since the organic-inorganic composite material according to aspects of the present invention contains the polymerization initiator as a component, a cured material can be obtained by curing the organic-inorganic composite material according to aspects of the present invention using various types of active energy and high workability can be achieved. Therefore, an optical element with a predetermined shape can be efficiently manufactured at low cost. In the case of transferring a shape using a die or the like during manufacture, the organic-inorganic composite material according to aspects of the present invention is best.

EXAMPLES

Examples of the present invention are described below. The present invention is not limited to the examples.

Examples of a multilayer diffractive optical element having a configuration shown in FIGS. 1A and 1B are described.

Example 1

An organic-inorganic composition a1 was produced as described below.

In 6,329.0 g of a xylene solvent, 142.3 g of a polycaprolactone serving as a dispersant was dissolved, followed by the addition of 709.0 g of fine particles of a transparent conductive substance, that is, fine ITO particles having an average size of 15 nm, whereby a xylene solution containing the polycaprolactone and the fine ITO particles was obtained. After being subjected to dispersion treatment in a bead mill using zirconia beads with an average size of 300 μm, the obtained xylene solution was filtered through a filter with a pore size of 100 nm, whereby slurry containing the xylene solvent and 9.87% by weight of the fine ITO particles dispersed therein was obtained.

The average size of the fine ITO particles was measured with a laser-scattering particle size distribution analyzer (ELS, manufactured by Otsuka Electronics Co., Ltd.).

Subsequently, 4.50 g of a diallyl ester of a naphthalene dicarboxylic acid having a naphthalene nucleus, 4.75 g of a urethane-modified polyester acrylate, 4.89 g of a fluorine-containing acrylate, and 0.37 g of a photopolymerization initiator, that is, 1-hydroxy-cyclohexyl phenyl ketone, were added to 71.80 g of the slurry and were then dissolved therein, whereby a mixed solution was obtained. The mixed solution was set in an evaporator. The pressure in the evaporator was gradually reduced from 100 hectopascals to 3 hectopascals finally at 45° C. The xylene solvent was sufficiently removed over 20 hours, whereby the organic-inorganic composition a1 of Example 1 was prepared, the organic-inorganic composition a1 being used to form a low-refractive index, high-dispersion layer.

Examples 2 to 4

Organic-inorganic compositions a2 to a4 were prepared in Examples 2 to 4, respectively, in substantially the same manner as that described in Example 1 except that the amount of the blended slurry of Example 1 was 92.90 g (Example 2), 140.00 g (Example 3), or 228.70 g (Example 4).

Example 5

Slurry containing the xylene solvent and 9.87% by weight of the fine ITO particles dispersed therein was obtained in the same manner as that described in Example 1.
Subsequently, 2.00 g of a diallyl ester of a naphthalene dicarboxylic acid and 8.00 g of a UV-curable resin, GRANDIC RC-C001 (produced by DIC Corporation), were added to 68.10 g of the slurry and were then dissolved therein, whereby a mixed solution was obtained. The mixed solution was set in an evaporator. The pressure in the evaporator was gradually reduced from 100 hectopascals to 3 hectopascals finally at 45° C. The xylene solvent was sufficiently removed over 20 hours, whereby an organic-inorganic composition b1 of Example 5 was prepared, the organic-inorganic composition b1 being used to form a low-refractive index, high-dispersion layer.

Examples 6 and 7

Organic-inorganic compositions b2 and b3 a4 were prepared in Examples 6 and 7, respectively, in substantially the same manner as that described in Example 5 except that the amount of the blended slurry of Example 5 was 102.60 g (Example 6) or 183.40 g (Example 7).

Example 8

Slurry containing the xylene solvent and 9.87% by weight of the fine ITO particles dispersed therein was obtained in the same manner as that described in Example 1.
Subsequently, 10.00 g of a diallyl ester of a naphthalene dicarboxylic acid and 0.37 g of a photopolymerization initiator, that is, 1-hydroxy-cyclohexyl phenyl ketone, were added to 106.7 g of the slurry and were then dissolved therein, whereby a mixed solution was obtained. The mixed solution was set in an evaporator. The pressure in the evaporator was gradually reduced from 100 hectopascals to 3 hectopascals finally at 45° C. The xylene solvent was sufficiently removed over 20 hours, whereby an organic-inorganic composition c1 of Example 8 was prepared, the organic-inorganic composition c1 being used to form a low-refractive index, high-dispersion layer.

Comparative Example 1

Slurry containing the xylene solvent and 9.87% by weight of the fine ITO particles dispersed therein was obtained in the same manner as that described in Example 1.
Subsequently, 10.00 g of GRANDIC RC-C001 was added to 68.10 g of the slurry and was then dissolved therein, whereby a mixed solution was obtained. The mixed solution was set in an evaporator. The pressure in the evaporator was gradually reduced from 100 hectopascals to 3 hectopascals finally at 45° C. The xylene solvent was sufficiently removed over 20 hours, whereby an organic-inorganic composition f1 of Comparative Example 1 was prepared, the organic-inorganic composition f1 being used to form a low-refractive index, high-dispersion layer.

Comparative Example 2

An organic-inorganic composition f2 of Comparative Example 2 was prepared in substantially the same manner as that described in Comparative Example 1 except that the amount of the slurry prepared in Comparative Example 1 was 82.80 g.

Comparative Example 3

Slurry containing the xylene solvent and 9.87% by weight of the fine ITO particles dispersed therein was obtained in the same manner as that described in Example 1.
Subsequently, 9.70 g of a fluorine-containing acrylate and 0.28 g of a photopolymerization initiator, that is, 1-hydroxy-cyclohexyl phenyl ketone, were added to 55.95 g of the slurry and was then dissolved therein, whereby a mixed solution was obtained. The mixed solution was set in an evaporator. The pressure in the evaporator was gradually reduced from 100 hectopascals to 3 hectopascals finally at 45° C. The xylene solvent was sufficiently removed over 20 hours, whereby an organic-inorganic composition g1 of Comparative Example 3 was prepared, the organic-inorganic composition g1 being used to form a low-refractive index, high-dispersion layer.

Comparative Example 4

An organic-inorganic composition g2 of Comparative Example 4 was prepared in substantially the same manner as that described in Comparative Example 3 except that the amount of the slurry prepared in Comparative Example 3 was 68.10 g.

Evaluation of Refractive Properties

A method of evaluating refractive properties of the following materials is described below: organic-inorganic composite materials A1 to A4, B1 to B3, and C1 that are cured materials of the organic-inorganic compositions a1 to a4, b1 to b3, and c1 of Examples 1 to 8 and organic-inorganic composite materials F1, F2, G1, and G2 that are cured materials of the organic-inorganic compositions f1, f2, g1, and g2 of Comparative Examples 1 to 4.

Each evaluation sample was prepared and was then measured for refractive properties as described below.

Figure 4A:
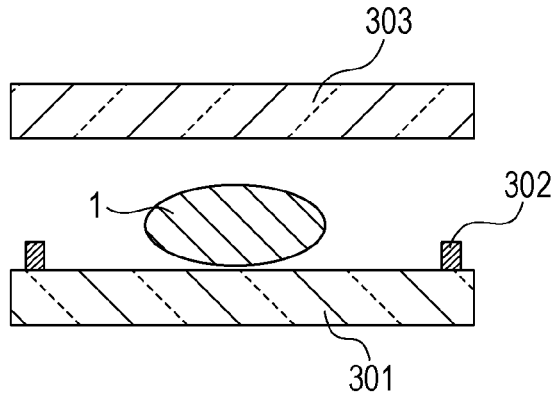
FIGS. 4A to 4D are schematic views illustrating a method of preparing a sample for evaluating refractive index.
Figure 4B:
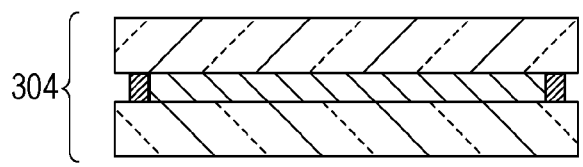
Figure 4C:
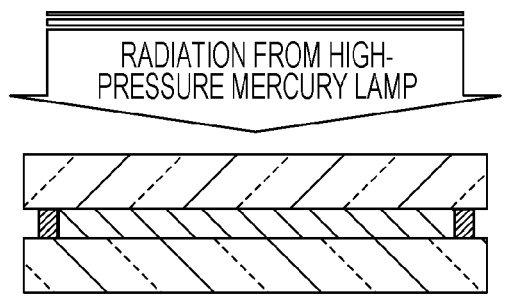
Figure 4D:
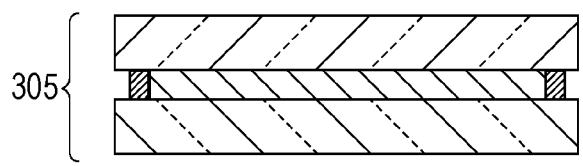

As illustrated in FIG. 4A, a spacer 302 with a thickness of 10 μm and one of the organic-inorganic compositions, for example, the organic-inorganic composition a1, were placed on a high-refractive index glass plate 301 with a thickness of 1 mm (FIG. 4A). A BK7 glass plate 303 with a thickness of 1 mm was put on the organic-inorganic composition a1 with the spacer 302 therebetween and the organic-inorganic composition a1 was pressed flat, whereby a sample 304 was obtained (FIG. 4B). The sample 304 was irradiated with light from a high-pressure mercury lamp (EXECURE 250, manufactured by HOYA CANDEO OPTRONICS Corporation) with an intensity of 20 mW/cm$^2$ for 1,000 seconds, whereby the organic-inorganic composition a1 was cured into the organic-inorganic composite material A1 (FIG. 4C). This provided a refractive index measurement sample 305 (FIG. 4D).

The refractive index measurement sample 305 was measured for refractive index at 435.8 nm (g-line), 486.1 nm (F-line), 546.1 nm (e-line), 587.6 nm (d-line), and 656.3 nm (C-line) using a refractometer (KPR-30, manufactured by Shimadzu Corporation). The Abbe number vd and the anomalous dispersion θg, F were calculated from the obtained refractive index. The evaluation of refractive properties was performed at 23° C.

Evaluation of Internal Transmittance

A method of evaluating the internal transmittance of the following materials is described below: organic-inorganic composite materials A1 to A4, B1 to B3, and C1 that are cured materials of the organic-inorganic compositions a1 to a4, b1 to b3, and c1 of Examples 1 to 8 and organic-inorganic composite materials F1, F2, G1, and G2 that are cured materials of the organic-inorganic compositions f1, f2, g1, and g2 of Comparative Examples 1 to 4.

Each evaluation sample was prepared and was then measured for internal transmittance as described below.

Figure 5A:
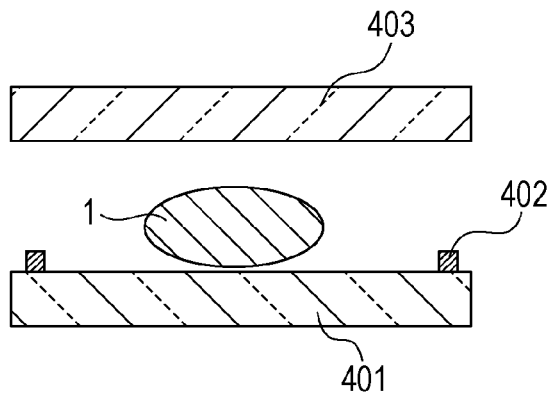
FIGS. 5A to 5D are schematic views illustrating a method of preparing a sample for evaluating internal transmittance.
Figure 5B:
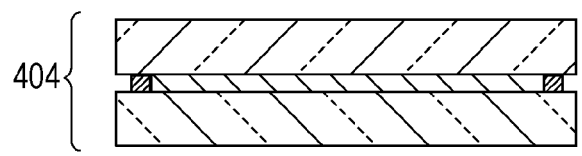
Figure 5C:
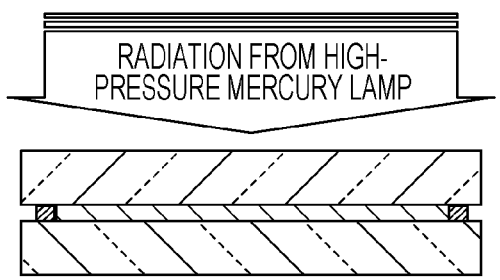
Figure 5D:
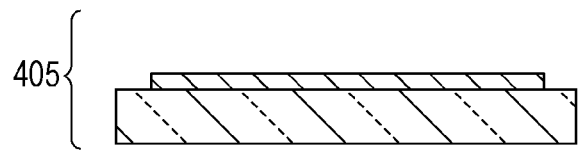

As illustrated in FIG. 5A, a spacer 402 with a thickness of 6.5 μm and one of the organic-inorganic compositions, for example, the organic-inorganic composition a1, were placed on a BK7 glass plate 401 with a thickness of 1 mm (FIG. 5A). A BK7 glass plate 403 with a thickness of 1 mm was put on the organic-inorganic composition a1 with the spacer 402 therebetween and the organic-inorganic composition a1 was pressed flat, whereby a sample 404 was obtained (FIG. 5B). The sample 404 was irradiated with light from a high-pressure mercury lamp (EXECURE 250, manufactured by HOYA CANDEO OPTRONICS Corporation) with an intensity of 20 mW/cm$^2$ for 1,000 seconds, whereby the organic-inorganic composition a1 was cured into the organic-inorganic composite material A1 (FIG. 5C). The BK7 glass plate 403 was stripped off, whereby an internal transmittance measurement sample 405 was obtained (FIG. 5D).

The internal transmittance measurement sample 405 was measured for transmittance at a wavelength of 370 nm to 730 nm using a spectrophotometer (U4000, manufactured by Hitachi, Ltd.). The internal transmittance of the organic-inorganic composite material A1 was calculated from the transmittance by taking into account the reflectivity of the organic-inorganic composite material A1 and the BK7 glass plate 401. Measurement was performed within 5 minutes after the BK7 glass plate 403 was stripped off.

Evaluation of Volume Fraction of Fine Particles of Transparent Conductive Substance The content of fine particles of a transparent conductive substance in each cured material was measured using TGA (TGA Q500, manufactured by TA Instruments). The weight percentage of residue obtained by heating the cured material to 600° C. was determined and was then converted into the volume percentage of the fine particles of the transparent conductive substance in the cured material. The density of the fine particles of the transparent conductive substance, that is, the fine ITO particles, was 6.7.

The density of the cured material was determined with a direct reading density-measuring system by a density gradient tube method and was then calculated into the volume of the cured material. The content (volume percent) of the fine particles of the transparent conductive substance in the cured material was calculated from the volume of the fine particles thereof and the volume of the cured material. The cured material was cut into pieces with appropriate dimensions before evaluation.

Table 1 shows the volume fraction of the fine particles of the transparent conductive substance in each of the organic-inorganic composite materials A1 to A4, B1 to B3, and C1 of Examples 1 to 8 and refractive properties and the internal transmittance of each of the organic-inorganic composite materials A1 to A4, B1 to B3, and C1 thereof. The refractive properties include the refractive index nd at 587.6 nm, the Abbe number vd, and the anomalous dispersion θg, F. The internal transmittance is a value determined at a thickness of 6.5 μm and a wavelength λ of 550 nm.

TABLE 1

| | Organic-inorganic composite material forming low-refractive index, high-dispersion layer | Amount of fine particles of transparent conductive substance Volume fraction (% by volume) | Refractive properties | | | Judgment | Internal transmittance (%) (A thickness of 6.5 μm, a wavelength of 550 nm) |
|---|---|---|---|---|---|---|---|
| | | | Refractive index nd | Abbe number vd | Anomalous dispersion θg, F | | |
| Example 1 | A1 | 7.7 | 1.541 | 23.00 | 0.484 | Good | 95.7 |
| Example 2 | A2 | 9.54 | 1.546 | 21.32 | 0.467 | Good | 94.7 |
| Example 3 | A3 | 13.0 | 1.555 | 18.82 | 0.443 | Good | 92.9 |
| Example 4 | A4 | 18.0 | 1.568 | 16.22 | 0.418 | Good | 90.3 |
| Example 5 | B1 | 9.54 | 1.560 | 22.72 | 0.460 | Good | 94.7 |
| Example 6 | B2 | 13.0 | 1.568 | 19.86 | 0.437 | Good | 92.9 |
| Example 7 | B3 | 19.0 | 1.581 | 16.43 | 0.410 | Good | 89.8 |
| Example 8 | C1 | 13.0 | 1.599 | 16.19 | 0.499 | Good | 92.9 |

Likewise, Table 2 shows the volume fraction of the fine particles of the transparent conductive substance in each of the organic-inorganic composite materials F1, F2, G1, and G2 of Comparative Examples 1 to 4 and refractive properties and the internal transmittance of each of the organic-inorganic composite materials F1, F2, G1, and G2 thereof.

having refractive properties shown in Table 3. The high-refractive index, low-dispersion material used was one containing an acrylic resin and fine particles of $ZrO_2$, which is a metal oxide, uniformly dispersed therein. Refractive properties of the high-refractive index, low-dispersion material were adjusted by varying the content of the fine $ZrO_2$ particles with

TABLE 2

| | Organic-inorganic composite material forming low-refractive index, high-dispersion layer | Amount of fine particles of transparent conductive substance Volume fraction (% by volume) | Refractive properties | | | | Internal transmittance (%) (A thickness of 6.5 µm, a wavelength of 550 nm) |
|---|---|---|---|---|---|---|---|
| | | | Refractive index nd | Abbe number vd | Anomalous dispersion θg, F | Judgment | |
| Comparative Example 1 | F1 | 9.54 | 1.551 | 24.79 | 0.433 | Poor | 94.7 |
| Comparative Example 2 | F2 | 11.1 | 1.555 | 23.00 | 0.424 | Poor | 93.9 |
| Comparative Example 3 | G1 | 9.54 | 1.471 | 23.40 | 0.410 | Poor | 94.7 |
| Comparative Example 4 | G2 | 11.0 | 1.478 | 21.64 | 0.404 | Poor | 94.0 |

Among the organic-inorganic composite materials shown in Tables 1 and 2, those having refractive properties satisfying a range surrounded by (vd, θg, F)=(16, 0.50), (16, 0.40), (23, 0.50), (23, 0.47) are judged to be good and those having no refractive properties satisfying the range are judged to be poor.

Table 1 confirms that the organic-inorganic composite materials A1 to A4, B1 to B3, and C1 of Examples 1 to 8 have refractive properties satisfying the above range. The content of the fine particles of the transparent conductive substance therein ranges from 7.7% to 20.0% by volume.

Table 2 confirms that the organic-inorganic composite materials F1, F2, G1, and G2 of Comparative Examples 1 to 4 have refractive properties that do not satisfy the above range regardless of the content of the fine particles of the transparent conductive substance therein.

It is clear that the internal transmittance basically depends on the content of the fine particles of the transparent conductive substance. The less the volume fraction of the fine particles of the transparent conductive substance in each organic-inorganic composite material is, the higher the transmittance is. The more the volume fraction thereof is, the lower the transmittance is. In comparison between those shown in Table 1 or 2 at the same volume fraction (9.54% by volume) or the same internal transmittance (94.7%), one shown in Table 1 has a lower Abbe number, which mainly affects the design value of the grating height among refractive properties. Therefore, in order to reduce the Abbe number vd of one shown in Table 2 close to an example, the content of the fine particles needs to be increased. This results in a reduction in internal transmittance.

Thus, the use of the organic-inorganic composite material of each example allows a predetermined low Abbe number vd, that is, a small grating height to be achieved using a smaller amount of the fine particles of the transparent conductive substance. This allows a highly transparent optical element to be achieved.

Production of Organic-Inorganic Composite Material Forming High-Refractive Index, Low-Dispersion Layer 103

Each high-refractive index, low-dispersion material used to form a high-refractive index, low-dispersion layer 103 to manufacture a multilayer diffractive optical element was one respect to the acrylic resin depending on optical design. Table 3 shows refractive properties of high-refractive index, low-dispersion materials A'1 to A'4, B'1 to B'3, and C'1.

TABLE 3

| | Organic-inorganic composite material forming high-refractive index, low-dispersion layer | Refractive properties | |
|---|---|---|---|
| | | Refractive index nd | Abbe number vd |
| Example 1 | A'1 | 1.591 | 45.61 |
| Example 2 | A'2 | 1.602 | 45.08 |
| Example 3 | A'3 | 1.623 | 44.18 |
| Example 4 | A'4 | 1.653 | 43.08 |
| Example 5 | B'1 | 1.609 | 44.76 |
| Example 6 | B'2 | 1.629 | 43.95 |
| Example 7 | B'3 | 1.663 | 42.73 |
| Example 8 | C'1 | 1.683 | 42.11 |

Manufacture of Multilayer Diffractive Optical Element 101

Each of multilayer diffractive optical elements having a configuration shown in FIGS. 1A and 1B was manufactured using a corresponding one of the organic-inorganic composite materials, which were low-refractive index, high-dispersion materials, shown in Table 1 and a corresponding one of organic-inorganic composite materials, that is, the high-refractive index, low-dispersion materials shown in Table 3.

Each multilayer diffractive optical element was manufactured by a method shown in FIGS. 6A to 6H.

A method of manufacturing a multilayer diffractive optical element using an organic-inorganic composite material A1 and an organic-inorganic composite material A'1 is described as a representative.

Figure 6A:
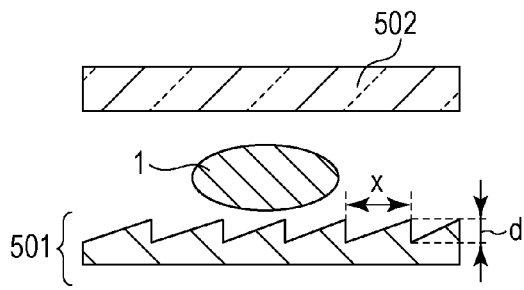
FIGS. 6A to 6H are schematic views illustrating a method of manufacturing a multilayer diffractive optical element according to an embodiment of the present invention.
Figure 6F:
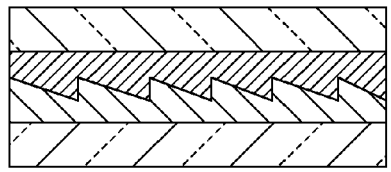
Figure 6B:
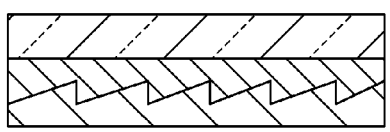
Figure 6G:
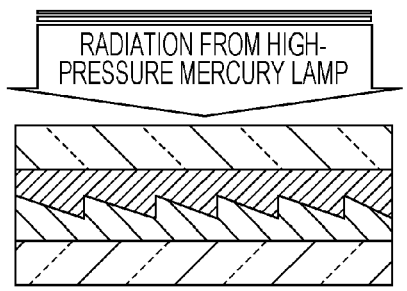
Figure 6C:
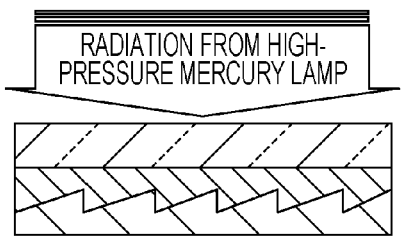
Figure 6H:
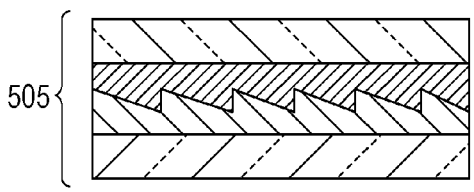
Figure 6D:
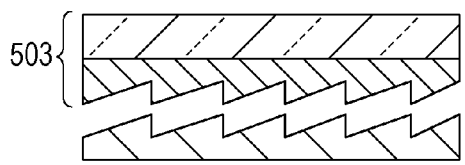
Figure 6E:
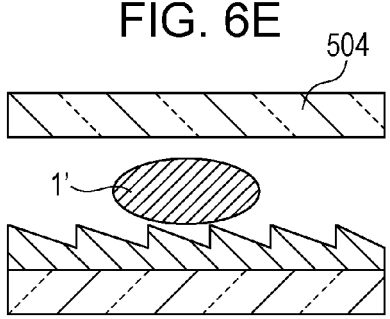

An organic-inorganic composition a1 and a transparent substrate 502 were provided on a die 501 that was worked by cutting and polishing so as to form a diffraction grating having a grating height d of 11.80 µm, a pitch x of 200 µm, and a surface roughness Ra of 2 nm (FIG. 6A). Next, the organic-inorganic composition a1 is filled in a die pattern by pressing the transparent substrate 502, whereby molding was performed (FIG. 6B). The organic-inorganic composition a1 was irradiated with light from a high-pressure mercury lamp with an intensity of 20 mW/cm$^2$ for 1,000 seconds with the organic-inorganic composition a1 maintained as it was (FIG. 6C). Thereafter, the transparent substrate 502 was separated from the die 501, whereby a diffractive optical element 503 made of the organic-inorganic composite material A1 formed by curing the organic-inorganic composition a1 was obtained (FIG. 6D). The uncured organic-inorganic composite material A'1 was put on a diffraction grating surface of the obtained diffractive optical element 503 (FIG. 6E). A transparent substrate 504 was put on the uncured organic-inorganic composite material A'1 and the uncured organic-inorganic composite material A'1 was pressed flat (FIG. 6F). The uncured organic-inorganic composite material A'1 was irradiated with light from a high-pressure mercury lamp with an intensity of 20 mW/cm$^2$ for 1,000 seconds through the transparent substrate 504 and was cured (FIG. 6G). This provided a multilayer diffractive optical element P1 made of the organic-inorganic composite material A1 and organic-inorganic composite material A'1 sandwiched between the transparent substrates 502 and 504 (FIG. 6H).

Other multilayer diffractive optical elements P2 to P8 were manufactured in substantially the same manner as above.

Table 4 shows dimensions (grating height d and pitch x) of a diffraction grating of each of the multilayer diffractive optical elements P1 to P8.

The grating height d of each of the multilayer diffractive optical elements P1 to P8 was measured with a non-contact three-dimensional surface profiler (NewView 5000, Zygo K.K.). As a result, it was confirmed that the grating height was as designed.

Evaluation of Diffraction Efficiency

The multilayer diffractive optical elements P1 to P8 were measured for diffraction efficiency. The measurement results are shown in Table 4.

The diffraction efficiency is the percentage of the amount of light of the design order of a diffraction grating in the amount of light that is applied to a multilayer diffractive optical element and passes therethrough.

As shown in Table 4, those having a diffraction efficiency of 99% or more at a wavelength of 400 nm to 700 nm were evaluated to be good and those having a diffraction efficiency of less than 99% were evaluated to be poor. The evaluation of diffraction efficiency was performed at 23° C.

INDUSTRIAL APPLICABILITY

According to aspects of the present invention, the following composition and material can be provided: an organic-inorganic composition and organic-inorganic composite material used to form an optical element which has high diffraction efficiency in the visible range, which can be reduced in grating height, and which is highly transparent.

According to aspects of the present invention, an optical element and multilayer diffractive optical element made of the organic-inorganic composite material can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-191428 filed Sep. 2, 2011, which is hereby incorporated by reference herein in its entirety.

What is claimed is:

1. An optical element comprising:

a transparent substrate; and an organic-inorganic composite material placed on the transparent substrate, wherein the organic-inorganic composite material contains a cured material of an organic-inorganic composition containing a resin component, fine particles of a transparent conductive substance, and a polymerization initiator; refractive properties of the Abbe number vd and anomalous dispersion θg, F of the organic-inorganic composite material are within a range surrounded by (vd, θg, F)=(16, 0.50), (16, 0.40), (23, 0.50), (23, 0.47); the content of the fine particles of the transparent conductive substance in the organic-inorganic composite material is from 7.7% to 20.0% by volume; and the resin

TABLE 4

| | Organic-inorganic composite material forming low-refractive index, high-dispersion layer | Organic-inorganic composite material forming high-refractive index, low-dispersion layer | Multilayer diffractive optical element | Shape of diffractive grating | | Diffraction efficiency (%) |
|---|---|---|---|---|---|---|
| | | | | Grating height d (μm) | Pitch x (μm) | |
| Example 1 | A1 | A'1 | P1 | 11.80 | 200 | Good |
| Example 2 | A2 | A'2 | P2 | 10.30 | 200 | Good |
| Example 3 | A3 | A'3 | P3 | 8.40 | 200 | Good |
| Example 4 | A4 | A'4 | P4 | 6.70 | 200 | Good |
| Example 5 | B1 | B'1 | P5 | 11.60 | 200 | Good |
| Example 6 | B2 | B'2 | P6 | 9.25 | 200 | Good |
| Example 7 | B3 | B'3 | P7 | 6.85 | 200 | Good |
| Example 8 | C1 | C'1 | P8 | 7.15 | 200 | Good |

Evaluation Results

Figure 7:
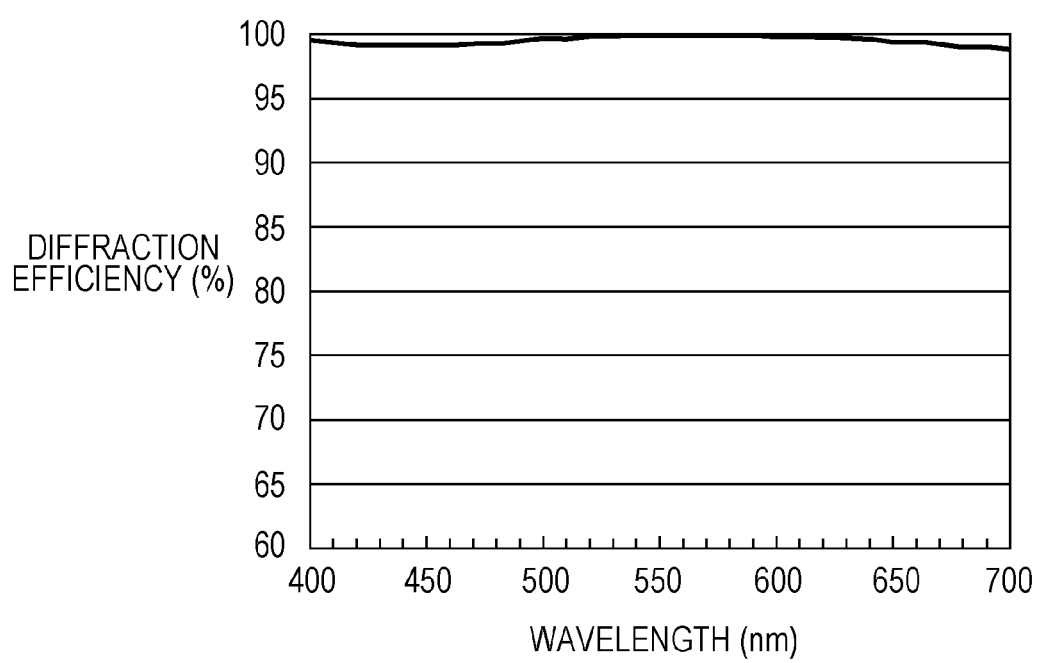
FIG. 7 is a graph illustrating the diffraction efficiency of a multilayer diffractive optical element P1 prepared in Example 1.

As is clear from Table 4, the multilayer diffractive optical elements P1 to P8, which are made of an organic-inorganic composite material according to aspects of the present invention, have a good diffraction efficiency of 99% or more at a wavelength of 400 nm to 700 nm in the visible range. FIG. 7 is a graph illustrating the diffraction efficiency of the multilayer diffractive optical element P1 at each wavelength.

component contains a compound represented by the following formula:

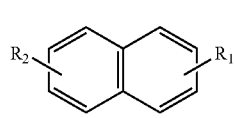

(1)

wherein $R_1$ and $R_2$ represent a hydrogen atom or a polymerizable functional group including any one selected from a group consisting of an acrylic group, a methacrylic group, an allyl group, a vinyl group, and an epoxy group, and wherein one or both of $R_1$ and $R_2$ represent the polymerizable functional group.

2. The optical element according to claim 1, wherein the organic-inorganic composite material has a diffractive surface having a diffraction pattern.

3. A multilayer diffractive optical element comprising:
a first diffractive optical sub-element; and
a second diffractive optical sub-element,
wherein the first diffractive optical sub-element has a diffractive surface having a diffraction pattern and is made of an organic-inorganic composite material containing a cured material of an organic-inorganic composition containing a resin component, fine particles of a transparent conductive substance, and a polymerization initiator; refractive properties of the Abbe number vd and anomalous dispersion θg, F of the organic-inorganic composite material are within a range surrounded by (vd, θg, F)= (16, 0.50), (16, 0.40), (23, 0.50), (23, 0.47); the content of the fine particles of the transparent conductive substance in the organic-inorganic composite material is from 7.7% to 20.0% by volume; the second diffractive optical sub-element is made of a material having a refractive index and Abbe number greater than those of the first diffractive optical sub-element and has a diffractive surface having a diffraction pattern; the first and second diffractive optical sub-elements are arranged such that the diffractive surfaces of the first and second diffractive optical sub-elements face each other and are in tight contact with each other; and the resin component contains a compound represented by the following formula:

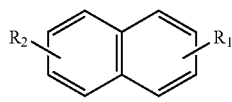

(1)

wherein $R_1$ and $R_2$ represent a hydrogen atom or a polymerizable functional group including any one selected from a group consisting of an acrylic group, a methacrylic group, an allyl group, a vinyl group, and an epoxy group, and wherein one or both of $R_1$ and $R_2$ represent the polymerizable functional group.

4. The optical element according to claim 1, wherein the compound represented by Formula (1) is one or more selected from a group consisting of: monoallyl esters of naphthalene dicarboxylic acids; diallyl esters of naphthalene dicarboxylic acids; monoacryloyloxyethyl esters of naphthalene dicarboxylic acids; diacryloyloxyethyl esters of naphthalene dicarboxylic acids; monomethacryloyloxyethyl esters of naphthalene dicarboxylic acids; dimethacryloyloxyethyl esters of naphthalene dicarboxylic acids; vinylnaphthalene; and divinylnaphthalene.

5. The optical element according to claim 1, wherein the compound represented by Formula (1) is a diallyl ester of a naphthalene dicarboxylic acid or a diacryloyloxyethyl ester of a naphthalene dicarboxylic acid.

6. The optical element according to claim 1, wherein the transparent conductive substance is one selected from a group consisting of: tin-doped indium oxide; antimony-doped tin oxide; zinc-doped indium oxide; aluminum-doped zinc oxide; gallium-doped zinc oxide; and fluorine-doped tin oxide.

7. The optical element according to claim 6, wherein the transparent conductive substance is tin-doped indium oxide.

8. The optical element according to claim 1, wherein primary particles of the transparent conductive substance have a number-average size of 2 nm to 50 nm.

9. The optical element according to claim 1, wherein a content of the compound that is included in the organic-inorganic composite material and represented by Formula (1) is 3% or more and 60% or less by weight.

10. The optical element according to claim 1, wherein the optical element is a lens.

11. The multilayer diffractive optical element according to claim 3, wherein the compound represented by Formula (1) is one or more selected from the group consisting of: monoallyl esters of naphthalene dicarboxylic acids; diallyl esters of naphthalene dicarboxylic acids; monoacryloyloxyethyl esters of naphthalene dicarboxylic acids; diacryloyloxyethyl esters of naphthalene dicarboxylic acids; monomethacryloyloxyethyl esters of naphthalene dicarboxylic acids; dimethacryloyloxyethyl esters of naphthalene dicarboxylic acids; vinylnaphthalene; and divinylnaphthalene.

12. The multilayer diffractive optical element according to claim 3, wherein the compound represented by Formula (1) is a diallyl ester of a naphthalene dicarboxylic acid or a diacryloyloxyethyl ester of a naphthalene dicarboxylic acid.

13. The multilayer diffractive optical element according to claim 3, wherein the transparent conductive substance is one selected from the group consisting of: tin-doped indium oxide; antimony-doped tin oxide; zinc-doped indium oxide; aluminum-doped zinc oxide; gallium-doped zinc oxide; and fluorine-doped tin oxide.

14. The multilayer diffractive optical element according to claim 12, wherein the transparent conductive substance is tin-doped indium oxide.

15. The multilayer diffractive optical element according to claim 3, wherein primary particles of the transparent conductive substance have a number-average size of 2 nm to 50 nm.

16. The multilayer diffractive optical element according to claim 3, wherein the multilayer diffractive optical element is a lens.

17. The multilayer diffractive optical element according to claim 3, wherein a height of grating of the multilayer diffractive optical element is 15 μm or less.

* * * * *